B. W. KADEL.
SIX WHEEL CAR TRUCK.
APPLICATION FILED DEC. 16, 1914.

1,151,471.

Patented Aug. 24, 1915.
2 SHEETS—SHEET 1.

Witnesses
F. W. Nover
M. H. Martin

Inventor
Byers W. Kadel

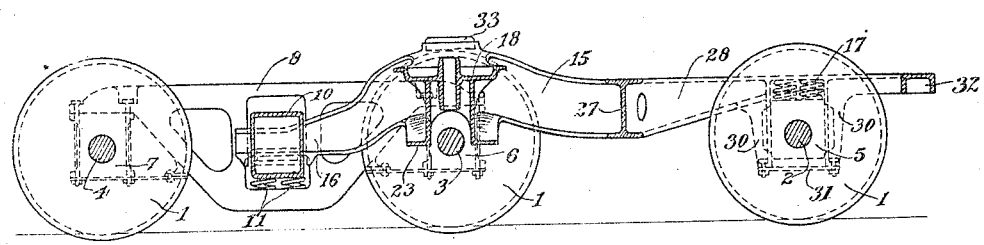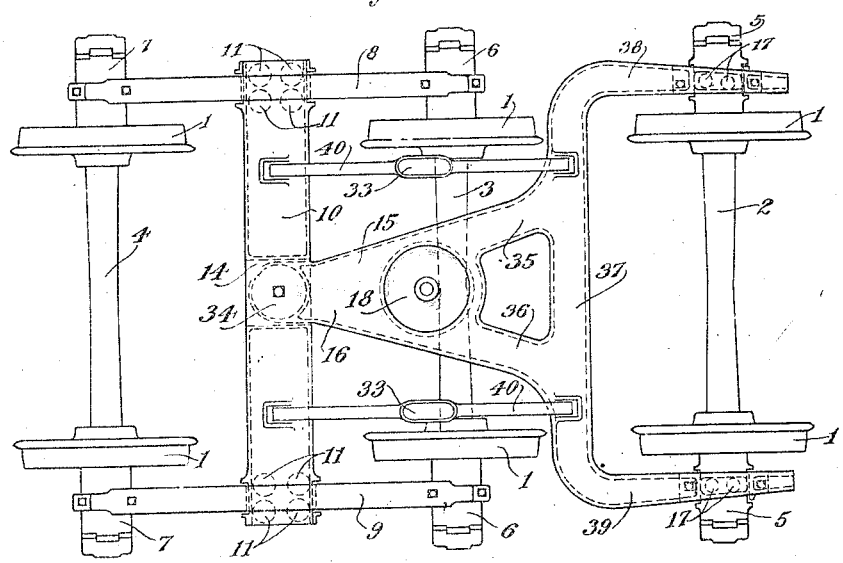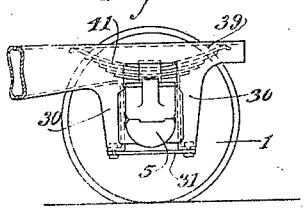

UNITED STATES PATENT OFFICE.

BYERS W. KADEL, OF ROANOKE COUNTY, VIRGINIA.

SIX-WHEEL CAR-TRUCK.

1,151,471. Specification of Letters Patent. Patented Aug. 24, 1915.

Application filed December 16, 1914. Serial No. 377,568.

*To all whom it may concern:*

Be it known that I, BYERS W. KADEL, a citizen of the United States, residing in the county of Roanoke and State of Virginia, have invented certain new and useful Improvements in Six-Wheel Car-Trucks, of which the following is a specification.

This invention relates to six wheel car trucks and the object thereof is to provide an improved general form of truck and also improvements in the details thereof.

With these objects in view the invention consists of the formation, combination and arrangement of the various elements as herein described and finally claimed.

Figure 1:
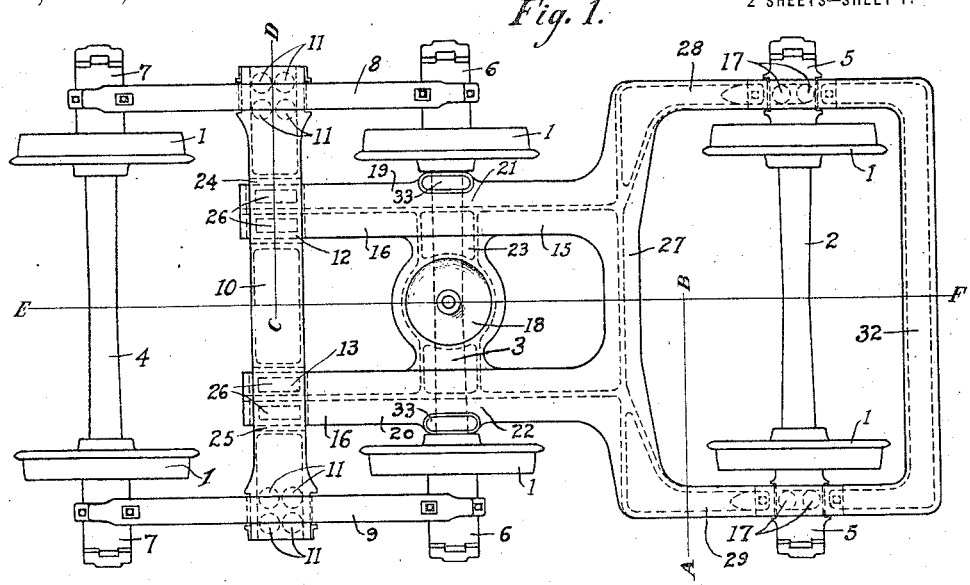
Figure 2:
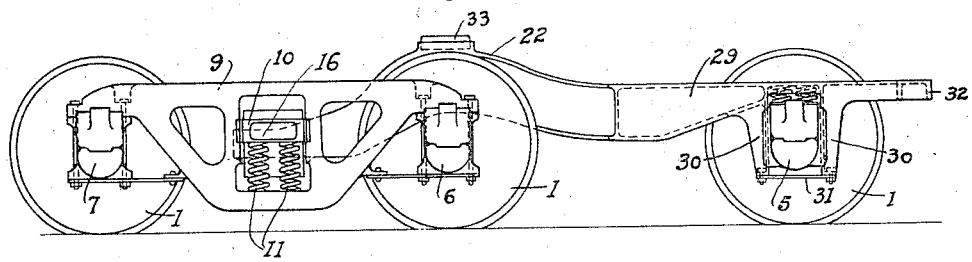
Figure 3:
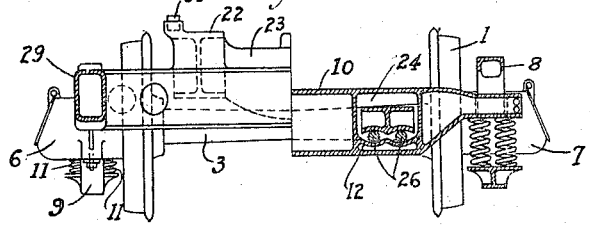

In the drawings, Figure 1 is a plan view of the truck of my invention and Fig. 2 a side elevational view of the same. Fig. 3 is a transverse, vertical section taken on the irregular line A—B—C—D, Fig. 1, and Fig. 4 a vertical, longitudinal section taken on the line EF, Fig. 1. Fig. 5 is a plan view of a modified form of this truck, the modifications shown therein being hereinafter described. Fig. 6 is a broken side elevational view showing the application of leaf springs to the trailer oil boxes.

Referring now to these drawings wherein like parts are similarly designated, 1—1 (etc.) represent the wheels mounted on the customary axles 2, 3 and 4 in the usual manner. The axles 2 and 4 are the end axles of my truck and the axle 3 the middle one thereof. These axles are journaled in oil boxes 5—5, 6—6 and 7—7 respectively and the arrangement of the parts of these oil boxes and bearings may be of any approved form. I consider it preferable, however, that the oil boxes 5—5 should be of the pedestal, or vertically sliding type, while the boxes 6—6 and 7—7 should be of the rigid type.

Disposed without the line of the truck wheels 1 and spanning the distance between the adjacent boxes 6 and 7 at each side of the truck, and supported by these boxes are side frames 8 and 9, and the boxes 6—6 and 7—7 are rigidly secured to these side frames in any of the customary manners.

Disposed transversely of the truck and yieldably supported by the side frames 8 and 9 is a transverse or cross-bolster 10, the springs 11 being interposed between the side frames and the ends of the cross bolster in the customary manner and for the usual purposes. Load supporting seats 12 and 13, (Fig. 1) or a single seat 14, (Fig. 5) are provided on the cross-bolster 10 and the load imposed thereon is carried successively through the said cross-bolster 10, the springs 11 and the side frames 8 and 9 to the oil boxes 6—6 and 7—7, thence to the axles 3 and 4 and their wheels 1 to the rail.

It will be seen that the parts just enumerated form a four-wheel truck of the type in common use under railway freight cars, and in the further description and in the operation of my truck these parts serve in effect just as an independent four-wheel truck.

It is now the particular object of this invention to apply to such a four-wheel truck a two-wheel trailer, and also to adapt the parts thereof to receive the load from the car body and to distribute such load among the 3 axles of the resulting six-wheel truck. To form such a trailer I provide a load supporting or trailer frame 15, the inner end 16 of which is disposed within the lines of the truck wheels and rests on and is supported by the cross-bolster 10. The outer end of this trailer frame is yieldably supported by the oil boxes 5—5 on the axles 2, these boxes having vertical movement relative to the said trailer frame, and the springs 17 being interposed between the said trailer frame 15 and the oil boxes 5—5. Thus the trailer frame is supported at one end by the four wheel truck portion and at the other end by the trailer wheels.

The load of the car body is received on a center bearing plate 18 on the load supporting or trailer frame, and in order to equalize the load upon all three axles, this center bearing plate is so located on the trailer frame that the longitudinal distance from the center of the trailer axle 2 to the center of the center bearing plate 18 is equal to twice the longitudinal distance from the center of the center bearing plate 18 to the center of the cross bolster 10. This center bearing plate is located on the longitudinal center line of the truck in order to provide the correct equalization of the loads transversely of the truck, and it also serves as a turning point or pintle for the rotation of the truck with reference to the car body when on curved track. Hence the inner end of the trailer frame is disposed within the lines of the wheels to accommodate this center bearing plate. Thus one-third of the center plate load will be transmitted to the axles 2 and the other two-thirds thereof to the cross-bolster 10, which, by the ordinary method of equalization employed in four-wheel trucks, is transmitted equally to the axles 3 and 4. Various forms of this trailer might be employed and in Figs. 1—2—3 and 4 I have shown a construction thereof that is especially suitable for very heavy loads. In this construction the trailer frame is composed of two parallel members 19 and 20 disposed longitudinally of the truck and immediately inside of the middle wheels, these parallel members being humped up at 21 and 22 to pass over the middle axle 3. The center bearing plate 18 is located on a transverse member 23 which extends from the member 21 to the member 22, this transverse member being of inverted U-shape in cross section, with the legs of the U extending downward along each side of the middle axle. The inner ends of the parallel members 19 and 20 extend through openings 24 and 25 in the cross-bolster 10 and are supported on the load supporting seats 12 and 13 thereof. The rollers 26 are inserted between these ends of the parallel members and the seats 12 and 13 thereof to allow relative movement between the trailer frame and the cross bolster 10. By providing the cross-bolster 10 with the horizontally disposed openings 24 and 25, with the load supporting seats 12 and 13 on the members below these openings, the inner end 16 of the trailer frame 15 may be dropped down as shown and the connection between the trailer frame and cross-bolster 10 will occupy less vertical space than would be the case were the trailer frame simply disposed on the top of this cross-bolster. At the same time the strength of the cross-bolster 10 will not be materially impaired by the openings 24 and 25. At their opposite ends, the parallel members 19 and 20 terminate in a transverse member 27 which extends transversely of the truck between the trailer wheels and the middle wheels. Attached to the outer ends of this member 27 and disposed outside of the trailer wheels are parallel members or arms 28 and 29, these members passing over the oil boxes 5—5 and transmitting their portion of the center plate load to them, the springs 17, as previously stated, being interposed between these arms and the oil boxes 5—5, the outer end of the trailer frame being bifurcated to form such integral members adapted to engage and coöperate with the oil boxes 5—5. It will be understood that various advantages, such as inspection and replacement of parts, are known to exist in favor of the location of oil boxes (5—6, 7) of such structures outside of the truck wheels instead of inside these wheels, for which reason I preferably form the parts of my truck to use this well known and accepted form of railway axles. Attached to the under sides of these arms 28 and 29 are pedestals 30, and the oil boxes 5—5 are guided in these pedestals and have vertical movement therein with reference to the arms 28 and 29. The pedestal tie bars 31 serve to prevent the dropping of the oil boxes from the pedestals when the truck is lifted up. Joining the extreme outer ends of the arms 28 and 29 is a transverse tie or brace 32, this serving to stiffen the trailer frame and make the members 28 and 29 work together when a transverse load is imposed on one of them. In the truck as shown in these figures, (Figs. 1—2—3 and 4), the three axles are equally spaced, the cross bolster 10 is midway between the axles 3 and 4 of the four-wheel truck portion, and the center bearing plate 18 is located immediately over the middle axle. Hence the center-plate loads are equalized in the truck as shown. Located on the humps 21 and 22 of the trailer frame 15, and just inside of the middle wheels, are side bearings 33, the same being here shown as having adjustable wearing shoes. It will be seen that by means of the springs 11 and 17 the entire center plate load is cushioned before reaching the axles, and the trailer frame and the cross-bolster have vertical movement on these springs with reference to the axles.

In Fig. 5 I have shown modified forms of some of the parts of my truck and I have shown also how the axles thereof may be unequally spaced and yet maintain perfect equalization of the load. The particular value of such unequal spacing of the axles is to produce a truck having an extremely short wheel base, it being possible with some forms of brake rigging to space the axles unequally as shown, thereby attaining this end. The equalization of the loads under such a condition becomes merely a matter of mathematical calculation as to the proportion of the various parts, as has been already described in these specifications. In this figure I have shown an altered form of trailer frame, the same being made in plan view in the general form of the letter A. At the apex of the A is a circular bearing 34 resting on the load supporting seat 14 and which transfers the portion of the center bearing plate load to the cross-bolster 10. At a correct distance from the bearing 34 for equalization purposes, is the center bearing plate 18, the same being disposed above and between the diverging legs 35 and 36 of the A. The transverse member 37 of this trailer frame, extending across the truck and between the middle wheels and the trailer wheels, forms the transverse member of the A, and from the outer ends of this transverse member 37 the arms 38 and 39 pass along the outside of the trailer wheels and over the oil boxes 5—5 as in the arrangement shown in the preceding figures, the outer end of the frame being supported by these oil boxes 5—5 and the axle 2.

The pedestals 30, springs 17, etc., function in the present arrangement the same as in the preceding one. However, the cross member or brace 32 between the outer ends of the arms has been omitted, as in lighter trucks it will not be required.

By making the bearing 34, of the trailer on the four-wheel truck portion, circular or pivotal, as shown, it will be seen that the entire trailer will rotate in plan view about this center, and my truck thus becomes a curve-adjusting truck, with consequent reduction of curve resistance and wheel and rail wear. The cross-bolster 10 in this case also is provided with a horizontal opening through the same to receive the end of the trailer frame 15, and the bottom member of the cross-bolster under the said opening is provided with a face or surface adapted to coöperate with the circular bearing plate 34. The four wheel portion of my truck, however, may be said to be a rigid truck, inasmuch as the two axles thereof can have no material rotatable movement relative to each other in a horizontal plane to adjust themselves to curves. This, however, is not considered necessary, as four wheel trucks are not usually provided with such curve adjusting means.

The construction shown in Figs. 1—2—3 and 4 acts to a more limited extent in this same manner, by means of the action of the rollers 26, together with some sliding of the parts at the seats 12 and 13. By making this trailer frame thus it will be seen that it is supported at three points, so that all these points will fall in a plane and there will be no possibility of one of the points of support being out of the general plane as might be the case when four points of support are used.

In Fig. 5, I have shown also an alternative method of supporting the side bearings 33, the same being located on bars or bridges 40 which extend between the cross bolster 10 and the transverse member 37 of this trailer frame. In order that these bars may not interfere with the slight relative movement of these parts necessary for the equalization of the load, the bars 40 are not rigidly attached to the cross bolster 10 and the transverse member 37, but are merely supported thereby. In trucks for some especial service it is necessary that elliptical or leaf springs be used instead of coil springs.

In Fig. 6 I have shown how I contemplate applying such a spring 41 over the trailer oil boxes 5—5, the same being inserted between the walls of the arms 38 and 39, and transmitting the load from these arms to the said oil boxes. The method of applying such springs to the four-wheel truck construction is well known in the art.

I have now described the present embodiment of my invention, but it will be evident that the essential features thereof as embraced in the appended claims may be embodied in various truck structures without departing from the spirit of my invention.

Having thus described my invention what I claim is:

1. In a six wheel car truck, an equalized four-wheel portion having a pair of side frames disposed without the lines of the truck wheels and having a transverse bolster supported thereby, a two wheel portion pivotally connected to the said four wheel portion and having rotatable movement with respect to the said four wheel portion in a horizontal plane, and a center bearing plate on the said two wheel portion, the said center bearing plate being so disposed on the said two-wheel portion that a portion of the superimposed load carried by the said center bearing plate will be delivered to the transverse bolster of the said four-wheel portion.

2. In a six wheel car truck, the combination with a four wheel rigid portion of a two wheel trailer portion pivotally connected thereto and having rotatable movement with respect to the said four wheel portion, and a center bearing plate on the said two wheel portion, the said center bearing plate being so disposed on the said two-wheel portion that a portion of the superimposed load carried by the said center bearing plate will be delivered to the said four-wheel rigid portion.

3. In a six-wheel car truck, a four-wheel portion having load supporting and load equalizing means, in combination with a two-wheel trailer, said two-wheel trailer embodying a trailer frame supported at one end upon the said four-wheel portion and at the other end upon the trailer wheels, and a center bearing plate on the said trailer frame, the said center bearing plate being so disposed on the trailer frame that the superimposed load thereon will be transmitted two-thirds to the wheels of the said four-wheel portion and the remaining one-third to the wheels of the said two-wheel trailer.

4. In a six-wheel truck for railway cars, the combination with a plurality of wheels, axles, bearings and oil boxes, of side frames disposed at the sides of the truck and resting on the oil boxes of two adjacent axles, a cross-bolster supported by the said side frames, a trailer frame supported at its inner end upon the said cross-bolster and at its outer end upon the oil boxes of a third axle, and a center bearing plate on the said trailer frame.

5. In a six wheel car truck, the combination with a plurality of wheels, axles, bearings, and oil boxes, of side frames disposed at the sides of the truck and without the lines of the wheels thereof and resting on the oil boxes of two adjacent axles, a cross-bolster supported by the said side frames, a trailer frame supported at its inner end upon the said cross-bolster and at its outer end upon the oil boxes of a third axle, and a center bearing plate on the said trailer frame.

6. In a six wheel car truck, the combination with a plurality of wheels, axles, bearings, and oil boxes, of side frames disposed at the sides of the truck and without the lines of the wheels thereof and resting on the oil boxes of two adjacent axles, a cross-bolster supported by the said side frames, a trailer frame supported at its inner end upon the said cross-bolster between the lines of the wheels, and at its outer end upon the oil boxes of a third axle, and a center bearing plate on the said trailer frame.

7. In a six-wheel car truck, the combination with a four-wheel portion of a two-wheel portion pivotally connected therewith and having rotatable movement with respect to the said four-wheel portion, and a center bearing plate on the said two-wheel portion, the said center bearing plate being adapted to receive the load from the car body, and the said load-supporting frame being adapted to deliver a portion of said load to the said four-wheel portion.

8. In a six wheel car truck, the combination with a plurality of axles of a load supporting frame supported thereby, the said frame being supported at three points, means on the said load supporting frame for receiving the load from the car body, and means for transferring the load from the said three points of support to the axles.

9. In a six-wheel car truck, the combination with a plurality of axles of a load supporting frame, the said frame being supported at three points, and having a center bearing plate thereon intermediate the said supporting points, and means for transferring the loads from the said load-supporting frame to the axles.

10. In a six-wheel car truck, the combination with a plurality of axles of a pair of side frames disposed at opposite sides of the truck and supported by two adjacent axles, a cross-bolster supported by the said side frames, springs interposed between the said side frames and the said cross bolster, a trailer frame supported at one end upon the said cross-bolster, and at the other end upon a third axle, springs interposed between the said trailer frame and the said third axle, and a center bearing plate on the said trailer frame.

11. In a car truck having six wheels, three axles and six oil boxes, a four-wheel portion having side frames with four of the said oil boxes rigidly secured thereto, and a two-wheel trailer having pedestals with the remaining two of the said oil boxes slidably engaged therein.

12. In a six-wheel car truck a load-supporting frame of A-shape in plan view, said load-supporting frame being supported at three points and these points being located respectively at the apex of the A and at the ends of the legs thereof, means on the said load-supporting frame for carrying the load of the car body, the said means being so disposed on the load-supporting frame that the superimposed load will be divided among the said three points of support, and means for supporting the said frame.

13. In a six-wheel car truck, the combination with a cross-bolster of a load-supporting frame supported at three points, one of said points of support being on the said cross-bolster, and side bearings yieldably supported at one end by the said cross-bolster and at the other end by the said load-supporting frame.

14. In a six wheel car truck, the combination with a plurality of wheels, axles, bearings and oil boxes, of side frames disposed at the sides of the truck and resting on the oil boxes of two adjacent axles, a cross-bolster yieldably supported upon the said side frames, a trailer frame supported at its one end upon the said cross-bolster and at its other end upon the oil boxes of a third axle, and a center bearing plate on the said trailer frame.

15. In a six wheel car truck, the combination with a plurality of wheels, axles, bearings and oil boxes, of side frames disposed at the sides of the truck and resting on the oil boxes of two adjacent axles, a cross-bolster yieldably supported upon the said side frames, a trailer frame supported at its one end upon the said cross-bolster and yieldably supported at its other end upon the oil boxes of a third axle, and a center bearing plate on the trailer frame.

16. In a six wheel car truck, the combination with a plurality of wheels, axles, bearings and oil boxes, of side frames disposed at the sides of the truck and supported by the oil boxes of two adjacent axles, the said oil boxes being rigidly secured to the said side frames, a cross-bolster supported upon the said side frames, a trailer frame supported at its one end upon the said cross-bolster and yieldably supported at its other end upon the oil boxes of a third axle, and a center bearing plate on the said trailer frame.

17. In a six wheel car truck, the combination of a plurality of axles, of a pair of side frames disposed at opposite sides of the truck and without the truck wheels and supported by two adjacent axles, a cross-bolster supported by the said side frames, springs interposed between the said side frames and the said cross-bolster, a trailer frame supported at one end upon the said cross-bolster and at the other end upon a third axle, springs interposed between the said trailer frame and the said third axle, and a center bearing plate on the said trailer frame.

18. In a six wheel car truck, the combination with a plurality of axles, of a pair of side frames disposed at opposite sides of the truck and without the truck wheels and supported by two adjacent axles, a cross-bolster supported by the said side frames, springs interposed between the said side frames and the said cross-bolster, a trailer frame supported at one end upon the said cross-bolster and at the other end upon a third axle, and a center bearing plate on the said trailer frame.

19. In a six wheel car truck, the combination with a plurality of axles of a pair of side frames disposed at opposite sides of the truck and without the truck wheels and supported by two adjacent axles, a cross-bolster supported by the said side frames, a trailer frame supported at one end upon the said cross-bolster and at the other end upon a third axle, and a center bearing plate on the said trailer frame.

20. In a car truck having six wheels, three axles, and six oil boxes, a four wheel portion having side frames with four of the said oil boxes rigidly secured thereto, and a two-wheel trailer having pivotal connection with the said four-wheel portion in a horizontal plane and being supported at its inner end upon the said four-wheel portion, the said point of support being within the lines of the truck wheels, the said two-wheel trailer having engagement with and being supported by the remaining two of the said oil boxes at its outer end and without the lines of the truck wheels.

21. In a car truck having six wheels, three axles, and six oil boxes, a four-wheel portion having side frames resting on four of the said oil boxes and having said oil boxes rigidly secured thereto, and a two-wheel trailer resting at one end upon the said four-wheel portion and at the other end upon the remaining two of the said oil boxes, and a center bearing plate on the said two-wheel trailer.

22. In a car truck having six wheels, three axles, and six oil boxes, a four-wheel portion having side frames resting on four of the said oil boxes and having said oil boxes rigidly secured thereto, and a two-wheel trailer resting at one end upon the said four-wheel portion and at the other end upon the remaining two of the said oil boxes, and a center bearing plate on the said two-wheel trailer.

23. In a car truck having six wheels, three axles, and six oil boxes, a four-wheel portion having side frames without the lines of the said wheels, a pair of side frames resting on and having rigidly secured thereto four of the said oil boxes, and a two-wheel trailer resting on the said four-wheel portion at one end within the lines of the said wheels and resting on the remaining two of the said oil boxes at the other end and without the lines of the said wheels.

24. In a six wheel car truck, a load supporting frame of A-shape in plan view, said load supporting frame being supported at three points and these points being located respectively at the apex of the A, and at the ends of the legs thereof, a center bearing plate on said load supporting frame intermediate the said points of support, and means for supporting the said frame.

25. In a six wheel car truck, a plurality of wheels, axles, bearings and oil boxes in combination with load-supporting and load-equalizing means supported upon two adjacent axles, supplemental load-supporting means supported at the inner end thereof upon the said first load-supporting means and at the other end thereof upon a third axle, the said supplemental load-supporting means comprising a trailer frame having its inner end disposed within the lines of the truck wheels and having its outer end bifurcated and the resulting arms disposed without the lines of the truck wheels, and a center bearing plate on the said trailer frame, the said center bearing plate being adapted to receive the load from the car body, and the said trailer frame being adapted to transmit a portion of such load to the said first load-supporting means and the remainder of such load to the said third axle.

26. In a six wheel car truck, the combination with a plurality of wheels, axles, bearings and oil boxes, of side frames disposed at the sides of the truck and resting on the oil boxes of two adjacent axles, a cross-bolster supported by the said side frames, a horizontally disposed opening through the said cross-bolster, a load-supporting frame having one end thereof supported by the said cross-bolster and embraced within the said opening therein, the other end of the said load-supporting frame being supported upon the oil boxes of a third axle, and a center bearing plate on the said load-supporting frame.

27. In a six wheel car truck, the combination with three axles, of oil boxes supported upon the ends of said axles, a side frame at each side of the truck supported at its ends upon the oil boxes of adjacent axles, a load-supporting cross-bolster supported upon the said side frames, a load-supporting frame supported at its inner end upon the said cross-bolster and at its outer end upon the oil boxes of the third of said axles, and means on the said load-supporting frame for receiving the load from the car body.

28. In a six wheel car truck, a four-wheel portion having two axles with their customary wheels, bearings and oil boxes and having load-supporting and load-equalizing means in conjunction therewith, in combination with a two-wheel trailer having an axle with similar wheels, bearings and oil boxes, the said two wheel trailer embodying further a trailer frame having the inner end thereof disposed within the lines of the said wheels, and being supported upon the said four-wheel portion, the outer end of said trailer frame being bifurcated and having the two arms thereof disposed without the lines of the said wheels and being supported upon the oil boxes of the said trailer axle, and means on the trailer frame for receiving the load from the car body, the said load-receiving means being so disposed on the trailer frame that a portion of the superimposed load will be transmitted through the trailer frame to the said four-wheel portion and the remainder of such load to the said trailer wheels.

In testimony whereof I affix my signature in presence of two witnesses.

BYERS W. KADEL.

Witnesses:
  ROY K. BROWN,
  R. H. PERSINGER.